United States Patent [19]

Rice et al.

[11] Patent Number: 5,629,396

[45] Date of Patent: May 13, 1997

[54] LATEX CONTAINING OXAZOLINE FOR INDUSTRIAL COATINGS

[75] Inventors: Daniel B. Rice, Shepherd; James G. Galloway; William H. Keskey, both of Midland, all of Mich.

[73] Assignee: The Dow Chemical Company, Midland, Mich.

[21] Appl. No.: 368,826

[22] Filed: Jan. 5, 1995

Related U.S. Application Data

[63] Continuation of Ser. No. 127,982, Sep. 27, 1993, abandoned, which is a continuation of Ser. No. 629,938, Dec. 19, 1990, abandoned, which is a continuation of Ser. No. 297,507, Jan. 17, 1989, abandoned.

[51] Int. Cl.$^6$ .................. C08F 226/06; C08F 220/10; B05D 3/00
[52] U.S. Cl. .................. 526/260; 526/328.5; 427/388.1
[58] Field of Search .................. 526/260, 319, 526/328.5, 341, 343, 344, 346, 351; 427/388.1

[56] References Cited

U.S. PATENT DOCUMENTS

| 3,505,297 | 4/1970 | Sheetz et al. | 526/260 |
| 3,518,239 | 6/1970 | Frump et al. | 526/260 |
| 3,687,888 | 8/1972 | Frump et al. | 526/260 |
| 4,376,861 | 3/1983 | Lalk et al. | 548/237 |
| 4,460,029 | 7/1984 | Schuetz et al. | 152/359 |
| 4,474,923 | 10/1984 | Keskey et al. | 524/458 |
| 4,508,869 | 4/1985 | Keskey et al. | 526/260 |
| 4,560,736 | 12/1985 | Pischke et al. | 526/312 |
| 4,973,409 | 11/1990 | Cook | 210/699 |
| 5,073,299 | 12/1991 | Cook | 252/389.23 |
| 5,229,030 | 7/1993 | Clubley et al. | 252/389.23 |
| 5,233,020 | 8/1993 | Hase et al. | 528/423 |
| 5,328,635 | 7/1994 | Chou et al. | 252/194 |

FOREIGN PATENT DOCUMENTS

| 0176609 | 4/1986 | European Pat. Off. |
| 51-10837 | 1/1976 | Japan. |
| 2115283 | 4/1990 | Japan. |

OTHER PUBLICATIONS

*Encyclopedia of Polymer Science and Engineering* vol. 3, Wiley–Interscience, New York, 1985, pp. 615–675.

*Primary Examiner*—Joseph L. Schofer
*Assistant Examiner*—Wu C. Cheng

[57] ABSTRACT

The incorporation of oxazoline monomers into conventional latexes imparts resistance to flash rust and salt fog of industrial coatings which contain the oxazoline latex.

7 Claims, No Drawings

LATEX CONTAINING OXAZOLINE FOR INDUSTRIAL COATINGS

CROSS REFERENCE TO RELATED APPLICATION

This application is a continuation of application Ser. No. 08/127,982 filed Sep. 27, 1993, ABN., which is a U.S. patent file wrapper continuation of Ser. No. 07/629,938 filed Dec. 19, 1990, now abandoned, which is a continuation of application Ser. No. 07/297,507 filed Jan. 17, 1989, now abandoned.

BACKGROUND OF THE INVENTION

The present invention incorporates the use of oxazoline monomers in combination with other monomers typically used in emulsion polymerizations to prepare a copolymer latex that is salt fog and flash rust resistant when used in an industrial coating paint formulation.

Latex polymers are well known in the art to provide binding in paint formulations. However, such aqueous coatings can cause rusting when the formulations are coated on cold rolled steel.

SUMMARY OF THE INVENTION

Accordingly, the present invention is a method of increasing the resistance of a latex based coating to rusting and salt fog by the addition of oxazoline monomers during the polymerization of the copolymer latex. Specifically, the present invention is an emulsion polymerized copolymer having (a) a first charge of monomer comprising an effective amount of at least one ethylenically unsaturated monomer and (b) a second charge of monomer comprising (i) an effective amount of an oxazoline monomer represented by the following formula:

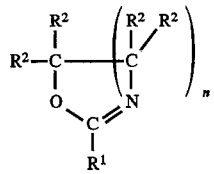

wherein $R^1$ is a polymerizable organic group; each $R^2$ is independently hydrogen, halogen, alkyl, or alkylene group of two to four carbons; and (ii) an effective amount of at least one ethylenically unsaturated comonomer.

DETAILED DESCRIPTION OF THE INVENTION

The present invention is an industrial coating formulation which comprises a copolymer of an oxazoline monomer represented by the formula:

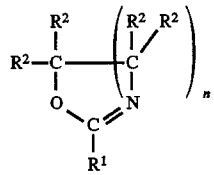

wherein $R^1$ is a polymerizable organic group; each $R^2$ is independently hydrogen, halogen, alkyl, or alkylene group of two to four carbons; and (ii) an effective amount of at least one ethylenically unsaturated comonomer. Preferably, $R^1$ is

wherein $R^3$ is hydrogen or an alkyl group. Most preferably, $R^1$ is an isopropenyl group. Each $R^2$ is preferably hydrogen or an alkyl group with hydrogen being most preferred; n is preferably 1. Most preferably the oxazoline is 2-isopropenyl-2-oxazoline.

The ethylenically unsaturated comonomers and mixtures of comonomers which are suitably employed with oxazoline monomer in the present copolymer latex include monovinyl aromatic monomers, aliphatic conjugated diene monomers, acrylate monomers, vinylidene halide or vinyl halide monomers, vinyl esters of carboxyl acids containing from 1 to 18 carbon atoms, such as vinyl acetate or vinyl stearate, methacrylonitrile and acrylonitrile. A monoethylenically unsaturated carboxylic acid monomer is also preferably included as a monomer in the first charge. The preferred comonomers of the first and second charge are the acrylate monomers.

The term "monovinyl aromatic monomer", as used herein, is meant to include those monomers with a polymerizable group of the formula

(wherein R is hydrogen or a lower alkyl such as an alkyl having from 1 to 4 carbon atoms) attached directly to an aromatic nucleus, including those wherein the aromatic nucleus is substituted with alkyl or halogen substituents. Examples include styrene, alpha methyl styrene, p-methyl styrene, t-butyl styrene, vinyltoluene, and halogenated styrene. The more preferred monomer of the monovinyl aromatic monomers is styrene.

Typically an effective amount of monovinyl aromatic monomer present in the copolymer will depend on the monomer chosen, however, the typical range will be from about 10 to about 90 weight percent based on the total weight of monomer.

The term "aliphatic conjugated diene", as used herein, is meant to include monomer compounds such as isoprene, 1,3-butadiene, 2-methyl-1,3-butadiene, piperylene (1,3-pentadiene), and other hydrocarbon analogs of 1,3-butadiene. Typically the amount of aliphatic conjugated diene monomer present in the copolymer will depend on monomer chosen, however, the typical range will be from about 0 to about 70 weight percent based on the total weight of monomer.

"Vinylidene halide" and "vinyl halide monomers" suitable for this invention include vinylidene chloride and vinyl chloride, which are highly preferred. Vinylidene bromides and vinyl bromide can also be employed.

Typically an effective amount of vinylidene halides and vinyl halides present in the copolymer will depend on monomer chosen, however, the typical range will be from about 10 to about 90 weight percent based on the total weight of monomer present.

The term "acrylate", as used herein, is meant to include acrylate or methacrylate monomers. The acrylates can include acids, esters, amides, and substituted derivatives thereof. Generally, the preferred acrylates are $C_1$–$C_8$ alkyl acrylates or methacrylates. Examples of such acrylates include butyl acrylate, hexyl acrylate, 2-ethyl hexyl acrylate, tert-butyl acrylate, methylmethacrylate, butylmethacrylate, ethyl methacrylate, hexylmethacrylate, isobutylmethacrylate, and isopropylmethacrylate and mixtures thereof. The preferred acrylates are butyl acrylate and methylmethacrylate.

Typically an effective amount of acrylate present in the copolymer will depend on monomer chosen, however, the typical range will be from about 10 to about 98 weight percent based on the total weight of the monomer.

The term "monoethylenically unsaturated carboxylic acid monomer", as used herein, is meant to include those monocarboxylic monomers such as acrylic acid, and methacrylic acid; dicarboxylic monomers such as itaconic acid, fumaric acid, maleic acid, and their monoesters.

Typically an effective amount of monoethylenically unsaturated carboxylic acid monomer present in the copolymer is that amount necessary to stabilize the copolymer particle. A typical example of such an amount is from about 0.5 to about 6 weight percent based on the total weight of monomer present.

The "oxazoline" monomer employed herein is as represented by the general structure:

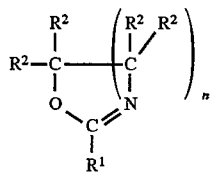

wherein $R^1$ is a polymerizable organic group; each $R^2$ is independently hydrogen, halogen, alkyl, or alkylene group of two to four carbons; and (ii) an effective amount of at least one ethylenically unsaturated comonomer. Preferably, $R^1$ is

wherein $R^3$ is hydrogen or an alkyl group. Most preferably, $R^1$ is an isopropenyl group. Each $R^2$ is preferably hydrogen or an alkyl group with hydrogen being most preferred; n is preferably 1. Most preferably the oxazoline is 2-isopropenyl-2-oxazoline The typically effective amounts of oxazoline monomer present are from about 0.25 to about 5.0 weight percent based on total amounts of monomer present in the copolymer. Preferably, the amounts of oxazoline present are from about 0.5 to about 2.0 weight percent based on total amounts of monomer present in the copolymer. Most preferably the amounts of oxazoline present are about 1.0 weight percent based on total amounts of monomer present in the copolymer.

A conventional crosslinking agent is also added during the polymerization of the monomers. Examples of conventional crosslinking agents include allyl acrylate, crotyl methacrylate or acrylate, ethylene glycol dimethacrylate and the like.

The monomers of the present invention can be polymerized by conventional emulsion polymerization processes. The more preferred method of polymerization is by a semi-continuous process. The polymerization is a two step process wherein a first charge of ethylenically unsaturated monomer, preferably a combination of acrylate monomers, and a monoethylenically unsaturated carboxylic acid is continuously added and allowed to polymerize; at the conclusion of the addition of the first monomer charge is added a second monomer charge typically comprised of the oxazoline monomer and at least one ethylenically unsaturated monomer preferably a combination of acrylate monomers. Prior to the addition of the second monomer charge of oxazoline monomer, the pH of the polymerization medium should be adjusted to greater than about 8.

The industrial coatings are typically formulated from a conventional pigment grind which is a mixture of: a pigment carrier such as water, a thickener, a defoamer, a wetting agent, a dispersant, a bacteriostat, pigments, a pigment stabilizer, a coalescent and a latex. The components are conventionally known components of industrial paint formulations.

The flash rust resistance of either the latex or the paint formulation is determined by drawing the mixture down on clean cold-rolled steel such as matte finish Q-panels. The mixture is dried at cool temperatures and elevated humidity such as in a Forma Scientific Environmental Chamber to allow the latex film or the paint film to dry slowly and thereby optimizing the conditions in which rusting will occur.

EXAMPLE

Butyl acrylate/methylmethacrylate/methacrylic acid monomers (48/48/4.5) by weight are continuously added with stirring over a period of 2.0 hours at 66 parts by weight (per 100 parts by weight of the total monomer charge) into an initial aqueous medium containing 0.01 part by weight of the pentasodium salt of diethylenetriaminepentacetic acid and 0.52 parts by weight of a styrene/acrylic acid (96/4) copolymer seed latex. In addition, an aqueous stream containing (based on 100 parts by weight of the total monomer charge) 40 parts of deionized water, 1.0 part of sodium dodecyldiphenyl ether disulfonate and 0.2 part of sodium persulfate is added over a period of 3.5 hours commencing at the same time the acrylate monomer charge is started. After the butyl acrylate/methylmethacrylate/methacrylic acid charge has been added, the pH is adjusted from 3.0 to 8.0 using ammonium hydroxide. Following the pH adjustment, a butyl acrylate/methylmethacrylate/isopropenyl oxazoline (47.5/47.5/3.0) monomer charge is continuously added with stirring over a 1.0 hour period to 34 parts by weight per 100 parts total monomer charge.

A paint formulation is then prepared as follows. A paint grind is prepared by mixing, at 3000 rpm in a Cowles disperser for 15 to 20 minutes: 510 grams of diethylene glycol monomethyl ether, 120 grams of a polycarboxylic acid salt which acts as a dispersant, 30 grams of octylphenoxypolyethoxyethyl benzyl ether which acts as a surfactant, 37.5 grams of a defoamer made from petroleum derivatives, and 2550 grams of a titanium dioxide pigment. Comparative Sample A and Sample A are prepared by mixing for each sample: 60 grams of the paint grind with 5.5 grams of diethylene glycol monobutyl ether; 2.2 grams of a rheology modifier of methane polymers: propylene glycol and water; 9.6 grams of a coalescent of 2,2,4-trimethyl-1, 3-pentanediol monoisobutyrate; latex; and water. The latexes used are Comparative Latex A, prepared similarly to the latex prepared above, comprising 47 percent styrene, 50 percent butylacrylate and 3 percent acrylic acid, and Latex A which is prepared similarly to the latex prepared above comprising 47 percent styrene, 49 percent butylacrylate 3 percent acrylic acid and 1 percent isopropyl oxazoline. The amount of latex added to the formulation is calculated such that 63.3 grams of latex solids are added to each sample. The total water added to the formulation is 122.9 grams. Ammonia hydroxide is then added to adjust the pH to about 10.

Drawdowns of each sample are then prepared on cold-rolled steel Q panels. Panels to be tested for salt fog in the salt fog chamber are drawn down using a 20 mil draw down bar at room temperature and allowed to air dry for a minimum of one week. The paint film thickness for each sample is 1.2 to 1.3 mil dry.

After 190 hours of exposure to salt fog as detailed in ASTM B-117, and the results are evaluated as described in ASTM D-610. Sample A exhibits a rust reading of 9-2 (the 9 indicates the relative amount of surface area with rust and the 2 indicates the blisters formed) compared to a 7-2 (the 7 indicates the relative amount of surface area with rust and the 2 indicates the blisters formed) rating for Comparative Sample A.

A sample of butyl acrylate/methylmethacrylate/acrylic acid/isopropenyl oxazoline (48/48/2.0/2.0) by weight is prepared similarly to the polymer latex prepared in Example 1. The sample is tested for flash rust resistance by drawing the latex alone down onto a R-36 Q panel using a 20 mil draw down bar and is immediately placed into a Forma Scientific Chamber set at 19° C. and 93 percent relative humidity. The film is permitted to dry for approximately 24 hours. The final film thickness is 5 mils. The film is visually inspected by the naked eye for flash rust; the sample showed no rust on the majority of the surface. Whereas, for the comparative example film prepared using a similar polymer but without the IPO, and exposed to the same conditions, rust appeared on the majority of the surface. Such data indicate a significant improvement in rust resistance when isopropenyl oxazoline is incorporated into the latex polymer.

What is claimed is:

1. A process for coating cold rolled steel by applying thereto a composition comprising an aqueous dispersion of latex copolymers prepared from ethylenically unsaturated monomers, wherein from 0.25 to 5.0 percent by weight of such monomers are of the formula:

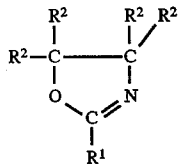

wherein $R^1$ is $H_2C=C(R^3)-$, wherein $R^3$ is hydrogen or an alkyl group; each $R^2$ is independently hydrogen, halogen, alkyl, or alkylene group of two to four carbons.

2. The process of claim 1 wherein the composition additionally comprises a pigment carrier, a thickener, a defoamer, a wetting agent, a dispersant, a bacteriostat, at least one pigment, and a pigment stabilizer.

3. The process of claim 1 wherein the ethylenically unsaturated monomer is selected from acrylate monomers.

4. The process of claim 1 wherein the oxazoline monomer is present in an amount of from about 0.25 to about 5.0 weight percent based on total amounts of monomer present in the copolymer.

5. The process of claim 1 wherein the oxazoline monomer is present in an amount of from about 0.5 to about 2.0 weight percent based on total amounts of monomer present in the copolymer.

6. The process of claim 1 wherein the oxazoline monomer is present in an amount of about 1.0 weight percent based on total amounts of monomer present in the copolymer.

7. A process for coating cold rolled steel by applying thereto a composition comprising a pigment grind, the pigment grind comprising:

a pigment carrier, a thickener, a defoamer, a wetting agent, a dispersant, a bacteriostat, at least one pigment, a pigment stabilizer and a latex which comprises:
(a) a first charge of monomer comprising an effective amount of at least one ethylenically unsaturated monomer and
(b) a second charge of monomer comprising (i) an effective amount of an oxazoline monomer represented by the following formula:

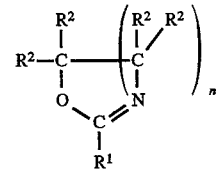

wherein $R^1$ is a polymerizable organic group; each $R^2$ is independently hydrogen, halogen, alkyl, or alkylene group of two to four carbons, and n=1.

* * * * *